(12) United States Patent
Keum et al.

(10) Patent No.: US 8,457,623 B2
(45) Date of Patent: Jun. 4, 2013

(54) APPARATUS, METHOD AND SYSTEM FOR DEVICE MANAGEMENT OF MOBILE COMMUNICATION TERMINAL

(75) Inventors: Ji-Eun Keum, Suwon-si (KR); Wuk Kim, Gwacheon-si (KR); Jae-Kwon Oh, Seoul (KR); Kyung-Tak Lee, Yongin-si (KR); Hae-Young Jun, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 628 days.

(21) Appl. No.: 11/760,568

(22) Filed: Jun. 8, 2007

(65) Prior Publication Data
US 2007/0287387 A1 Dec. 13, 2007

(30) Foreign Application Priority Data
Jun. 9, 2006 (KR) .................. 10-2006-0052231

(51) Int. Cl.
*H04W 24/00* (2009.01)
(52) U.S. Cl.
USPC ........ 455/423; 455/67.11; 455/424; 455/425; 455/115.1; 455/226.1; 370/241; 709/223
(58) Field of Classification Search
USPC ........................................... 455/67.11, 115.1
See application file for complete search history.

(56) References Cited

U.S. PATENT DOCUMENTS

| | | | | |
|---|---|---|---|---|
| 5,826,198 A | * | 10/1998 | Bergins et al. | 455/557 |
| 2004/0153545 A1 | * | 8/2004 | Pandya et al. | 709/226 |
| 2006/0128371 A1 | * | 6/2006 | Dillon et al. | 455/423 |
| 2007/0050762 A1 | * | 3/2007 | Chen et al. | 717/169 |
| 2007/0268516 A1 | * | 11/2007 | Bugwadia et al. | 358/1.15 |
| 2012/0102177 A1 | | 4/2012 | Kim et al. | |

FOREIGN PATENT DOCUMENTS

| | | |
|---|---|---|
| JP | 2003-022196 A | 1/2003 |
| JP | 2003-124866 A | 4/2003 |
| KR | 10-2003-0081743 A | 10/2003 |
| KR | 10-2006-0049893 A | 5/2006 |

OTHER PUBLICATIONS

"Enabler Release Definition for OMA Device Management", Version 1.2, Jun. 2, 2006; Open Mobile Alliance, pp. 1-15.*
"An introduction to OMA Device Management", Lin et al.; Oct. 31, 2006, IBM pp. 1-6.*

* cited by examiner

*Primary Examiner* — Kamran Afshar
*Assistant Examiner* — Khalid Shaheed
(74) *Attorney, Agent, or Firm* — Jefferson IP Law, LLP

(57) ABSTRACT

An apparatus, method and system for device management of a mobile communication terminal are provided. Various errors which may occur in the mobile communication terminal are monitored by the mobile communication terminal and are corrected remotely. In the method, the mobile communication terminal receives DiagMon policies from a DM server and stores the DiagMon policies in real-time in which the DiagMon policies are constructed in response to various errors. The mobile communication terminal monitors then the status of the mobile communication terminal according to periods set in the DiagMon policies. When a trouble is detected to occur, the mobile communication terminal collects detailed information related to the occurred trouble and transmits the detailed information to the DM server. The mobile communication terminal receives DiagMon correction information capable of correcting the occurred trouble from the DM server and corrects the trouble, and therefore normalizes the terminal.

13 Claims, 5 Drawing Sheets

APPARATUS, METHOD AND SYSTEM FOR DEVICE MANAGEMENT OF MOBILE COMMUNICATION TERMINAL

PRIORITY

This application claims the benefit under 35 U.S.C. §119(a) of a Korean patent application filed in the Korean Industrial Property Office on Jun. 9, 2006 and assigned Serial No. 2006-52231, the entire disclosure of which is hereby incorporated by reference.

BACKGROUND OF THE INVENTION

1. Field of the Invention

The present invention relates to a mobile communication terminal. More particularly, the present invention relates to an apparatus, method and system for device management of a mobile communication terminal, in which various errors that may occur in the mobile communication terminal are monitored and corrected remotely.

2. Description of the Related Art

Generally, mobile communication terminals that are used for mobile communications are subject to errors caused by either hardware or software of the terminals themselves. Mobile communication terminals are also subject to various errors caused by problems occurring in a communication network while providing services in cooperation with the communication network. In order to detect such problems and take actions accordingly, a function for diagnosis and monitoring of the terminals is needed. Device management systems have been implemented for the mobile communication terminal, which remotely manage the mobile communication terminal over the communication network.

A device management system for a mobile communication terminal typically includes a device management server and mobile communication terminals, each of which has a device management module and is connected to the device management server via the communication network.

When a user has trouble with their mobile communication terminal, the user communicates the fact that the trouble has occurred on the terminal to the device management server. The device management server searches for connection information of the terminal having the trouble and then connects to the terminal over the communication network. The device management server then requests information for monitoring. The information may include status and capabilities of various hardware or software provided to the mobile communication terminal, and information about the status of services implemented on the mobile communication terminal. The mobile communication terminal then collects the monitor information through the device management module and transmits the collected monitor information to the device management server. The device management server analyzes the received monitor information and perceives the occurred trouble of the mobile communication terminal. Based on the perceived trouble, the device management server creates correction information corresponding to the occurred trouble and transmits the correction information to the mobile communication terminal. The correction information may be a certain application, and the like. The mobile communication terminal corrects the trouble which has occurred therein using the received correction information.

The above described conventional device management scheme is passive and can not solve the trouble until it is notified of the trouble. More specifically, the conventional device management scheme cannot solve the trouble before the user feels uncomfortable because when the trouble occurs in the terminal, a device management process for the mobile communication terminal is performed only after the user communicates the fact that the trouble has occurred in the terminal to the server. Also, the conventional device management scheme can not perform the device management function adaptively to changing situations of the mobile communication terminal, user preferences, and the network.

SUMMARY OF THE INVENTION

An aspect of the present invention is to address the above-mentioned problems and/or disadvantages and provide at least the advantages described below. Accordingly, an aspect of the present invention is to provide an apparatus, method and system for device management of a mobile communication terminal, which can actively manage software or hardware or network errors that may occur in the mobile communication terminal.

Also, as aspect of the present invention is to provide an apparatus, method and system for device management of a mobile communication terminal, which can minimize user inconvenience.

In accordance with an aspect of the present invention, a method for device management of a mobile communication terminal is provided. The method includes creating and transmitting Diagnosis Monitoring (DiagMon) policy corresponding to one of various troubles that may occur in a mobile communication terminal, by a device management server, receiving and storing the DiagMon policy by the mobile terminal, determining, by the mobile terminal, that a trouble corresponding to the DiagMon policy occurs when a status of the mobile communication terminal monitored according to a period set in the DiagMon policy corresponds with a condition of trouble occurrence set in the DiagMon policy, collecting, by the mobile terminal, detailed status information related to the trouble, constructing DiagMon information by the mobile terminal, and transmitting the DiagMon information by the mobile communication terminal, analyzing the DiagMon information by the device management server, constructing, by the device management server, DiagMon correction information including an application to correct the trouble, transmitting the DiagMon correction information, receiving the DiagMon correction information by the terminal, and correcting the trouble by the mobile communication terminal.

In accordance with another aspect of the present invention, a system for device management of a mobile communication terminal is provided. The system includes a device management server for creating and transmitting Diagnosis Monitoring (DiagMon) policy corresponding to one of various troubles occurable in the mobile communication terminal, for analyzing DiagMon information received in response to the DiagMon policy, for constructing DiagMon correction information that includes an application to correct the trouble, and for transmitting the DiagMon correction information and a mobile communication terminal for receiving and storing the DiagMon policy, for determining that a trouble corresponding to the DiagMon policy occurs when status of the mobile communication terminal which is monitored according to period set in the DiagMon policy corresponds with a condition of trouble occurrence set in the DiagMon policy, for collecting detailed status information related to the trouble, for constructing DiagMon information, for transmitting DiagMon information, for receiving the DiagMon correction information related to the DiagMon policy and for correcting the trouble.

In accordance with another aspect of the present invention, an apparatus for device management of a mobile communication terminal is provided. The apparatus includes a Diagnosis Monitoring Agent (DiagMon Agent) which further includes a policy storing unit for receiving Diagnosis Monitoring (DiagMon) policy from a device management sever and for storing the received DiagMon policy in which the DiagMon policy is created corresponding to one of various troubles occurable in the mobile communication terminal, a trouble occurrence determining unit for requesting a monitoring unit to monitor the mobile communication terminal according to period set in the DiagMon policy and for determining that a trouble corresponding to the DiagMon policy occurs when status of the mobile communication terminal monitored in response to the request of monitoring corresponds with a condition of trouble occurrence set in the DiagMon policy, and a policy executing unit for executing the DiagMon policy when it is determined that the trouble occurs so as to collect detailed status information and construct DiagMon information and a DiagMon Enabler for transmitting the DiagMon information to the device management server.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
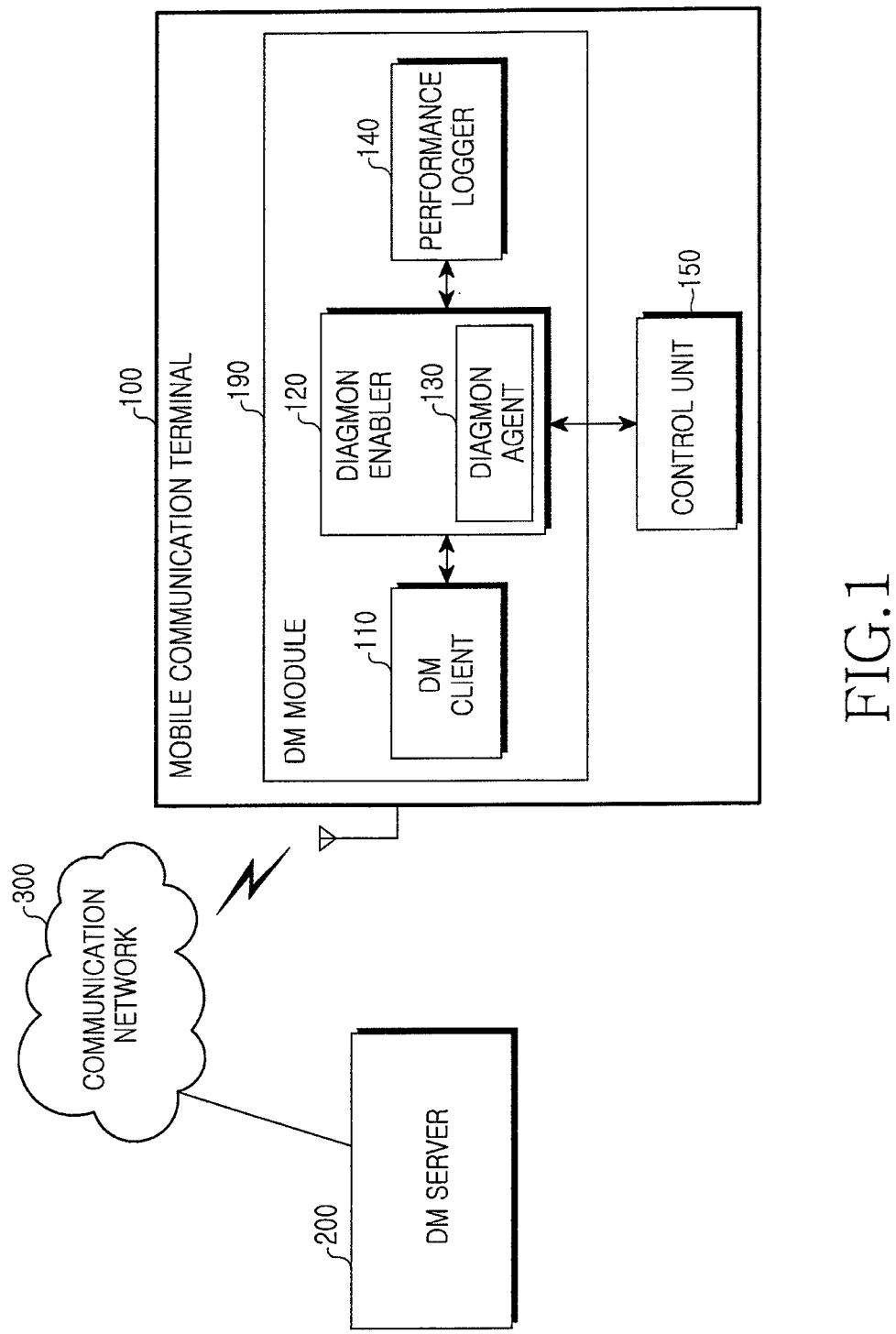
FIG. 1 is a view illustrating an architecture of a device management system for a mobile communication terminal according to an exemplary embodiment of the present invention.

The architecture of an exemplary device management system will be explained with reference to FIG. 1. FIG. 1 is a view illustrating the architecture of the device management system for a mobile communication terminal according to an exemplary embodiment of the present invention. Referring to FIG. 1, a device management system includes a Device Management Server ("DM server") 200, a mobile communication terminal 100 having a Device Management Module ("DM module") 190, and a communication network 300.

The DM server 200 creates various Diagnosis Monitoring ("DiagMon") policies capable of monitoring and diagnosing troubles which may occur in a mobile communication terminal 100, which is to be a management object, according to an exemplary embodiment of the present invention. The DM server 200 transmits the DiagMon policies to the mobile communication terminal 100 which is the management object. The DM server 200 receives DiagMon data from the mobile communication terminal which is the management object, and the DiagMon data is collected through the performing of the DiagMon policies. The DM server 200 analyzes the DiagMon data and perceives trouble that has occurred in the mobile communication terminal 100. The DM server 200 creates correction information capable of solving the trouble and transmits the correction information to the corresponding mobile communication terminal 100. To this end, the DM server 200 stores device information of various mobile communication terminals, connection information of the mobile communication terminals which are to be management objects, and a number of applications capable of handling various troubles which may occur in the mobile communication terminals. The device information includes information about hardware, software, etc., provided to or included with the mobile communication terminal. The connection information includes information needed to connect to each of the mobile communication terminals via the communication network 300, such as phone numbers, and the like.

The DM server 200 according to an exemplary embodiment of the present invention estimates troubles which may occur in the mobile communication terminals. Such troubles may occur due to errors on software or hardware provided to various mobile communication terminals, due to errors which are caused by errors on services implemented through the various mobile communication terminals, due to errors on the network, and the like. The DM server 200 also executes DiagMon tasks corresponding to various troubles to create the DiagMon policies which monitor and diagnose whether the troubles occur. The DiagMon policies include types of information to be collected and monitored in response to the occurable errors, conditions of trouble occurrence, device management information types, monitoring periods, internal configurations of the mobile communication terminals to be monitored, a priority order of DiagMon policies, etc. The monitor information is collected when monitoring is performed on the mobile communication terminal intended to be detected in order to perceive whether the troubles have occurred. The conditions indicating that trouble has occurred include information about conditions for determining whether corresponding troubles occur or not. The device management information, which is collected through performing the DiagMon policies after it is determined that troubles have occurred in the mobile communication terminal, includes detailed information related to the troubles that have occurred. The priority order indicates which DiagMon policy of a plurality of the DiagMon policies is preferentially performed. The priority order may be determined based on the risk of an error that may occur, the significance of function of the mobile communication terminal related to the occurrence of the error, etc. Whenever necessary, the DiagMon policies may be created and sent to the corresponding mobile communication terminal based on either environment changes of the communication network or analysis of monitor information collected by performing existing DiagMon policies.

The DM server 200 transmits the DiagMon policies to a corresponding management object mobile communication terminal 100. The DM server 200 receives and analyzes the DiagMon information from the mobile communication terminal 100 which has received and performed the DiagMon policies to collect the DiagMon information. Therefore, the DM server 200 perceives trouble which has occurred in the mobile communication terminal 100. Thereafter, the DM server 200 constructs DiagMon correction information capable of correcting the trouble and normalizing the mobile communication terminal and transmits it to the corresponding mobile communication terminal 100. The DiagMon correction information includes various correction applications for correcting all errors.

The mobile communication terminal 100 is the management object of the DM server 200 and includes a DM module 190 and a control unit 150 according to an exemplary embodiment of the present invention. The mobile communication terminal 100 receives and stores the DiagMon policies. The mobile communication terminal 100 monitors the status for the periods set in the DiagMon policies and collects the monitored information. When an occurrence of trouble is detected based on the collected monitor information, the mobile communication terminal 100 collects the DiagMon information and transmits it to the DM server 200.

The control unit 150 controls the general operation of the mobile communication terminal 100 and cooperates with the DM module 190.

The DM module 190 performs the device management function for the mobile communication terminal 100 and includes a Device Management Client ("DM client") 110, a Diagnosis Monitoring Enabler ("DiagMon Enabler") 120, and a Performance Logger 140. The DM client 110 has a DiagMon Enabler interface, and transmits the DiagMon information collected by the DiagMon Enabler 120 to the DM server 200. The Performance Logger 140 stores performance logs according to the performing of the device management function.

The DiagMon Enabler 120 is connected with the DM client 110 and controls the device management function for the mobile communication terminal 100, and includes a Diagnosis Monitoring Agent ("DiagMon Agent") 130. The DiagMon Agent 130 performs the diagnosis and monitoring functions according to the DiagMon policies received from the DM server 200 in order to detect errors caused by various software and hardware provided to the mobile communication terminal, errors caused by services implemented on the mobile communication terminal, and errors caused by troubles of the communication network 300. The DiagMon Agent 130 also informs the DM client 110 of the DiagMon information collected therefrom. The DiagMon Agent 130 corrects the occurred trouble or normalizes the mobile communication terminal according to the DiagMon correction information received from the DM server 200.

Figure 2:
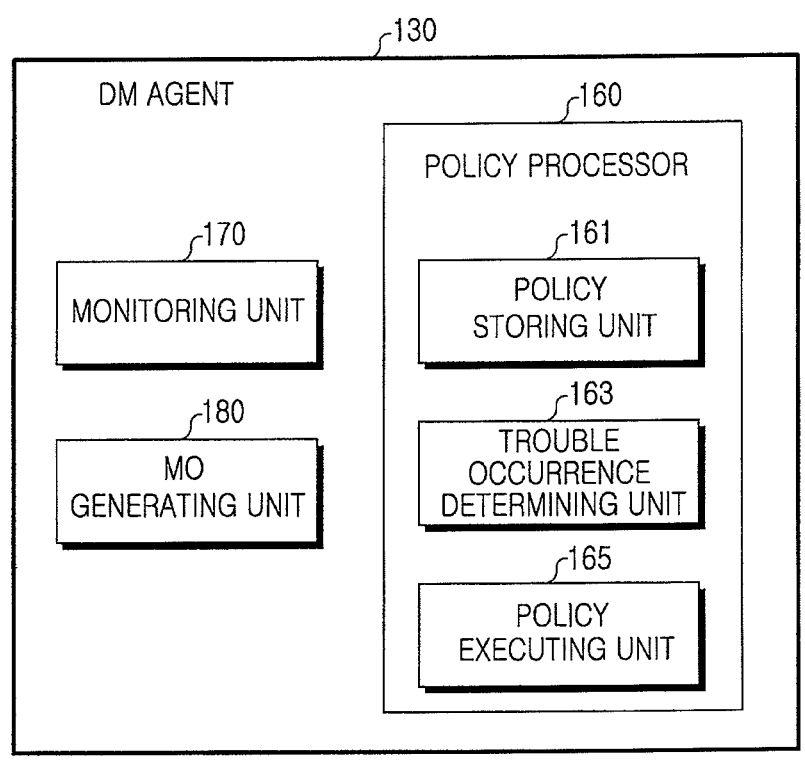
FIG. 2 is a view illustrating an architecture of a diagnosis/monitoring agent according to an exemplary embodiment of the present invention.

An exemplary DiagMon Agent 130 is illustrated in FIG. 2. An exemplary DiagMon Agent 130 includes a policy processor 160, a monitoring unit 170, and a Management Object (MO) generating unit 180. The monitoring unit 170 periodically monitors the mobile communication terminal under the control of the policy processor 160 and outputs the collected monitor information to the policy processor 160. The monitor information includes several pieces of information capable of being used to determine whether troubles have occurred. For example, the monitoring unit 170 collects service rate data for a certain function unit for which the monitoring unit 170 is monitoring and outputs it to the policy processor 160.

The policy processor 160 according to an exemplary embodiment of the present invention includes a policy storing unit 161, a trouble occurrence determining unit 163, and a policy executing unit 165. The policy storing unit 161 stores various DiagMon policies received from the DM server 200. The trouble occurrence determining unit 163 requests the monitoring unit 170 to monitor the mobile communication terminal according to the setting of each of the DiagMon policies, and then compares monitor information, which is input in response to the request, with the conditions of trouble occurrence set in corresponding DiagMon policies. If the monitor information corresponds with a condition of trouble occurrence, the trouble occurrence determining unit 163 determines that trouble has occurred and then informs the policy executing unit 165. The policy executing unit 165 is informed of the trouble occurrence, and then collects detailed information related to the occurred trouble and creates DiagMon information by executing a corresponding DiagMon policy. The policy executing unit 165 then outputs the created DiagMon information to the MO generating unit 180.

The MO generating unit 180 converts device management information to be input into a Management Object format and transmits it to the DM server 200 through the DiagMon Enabler 120.

Figure 3:
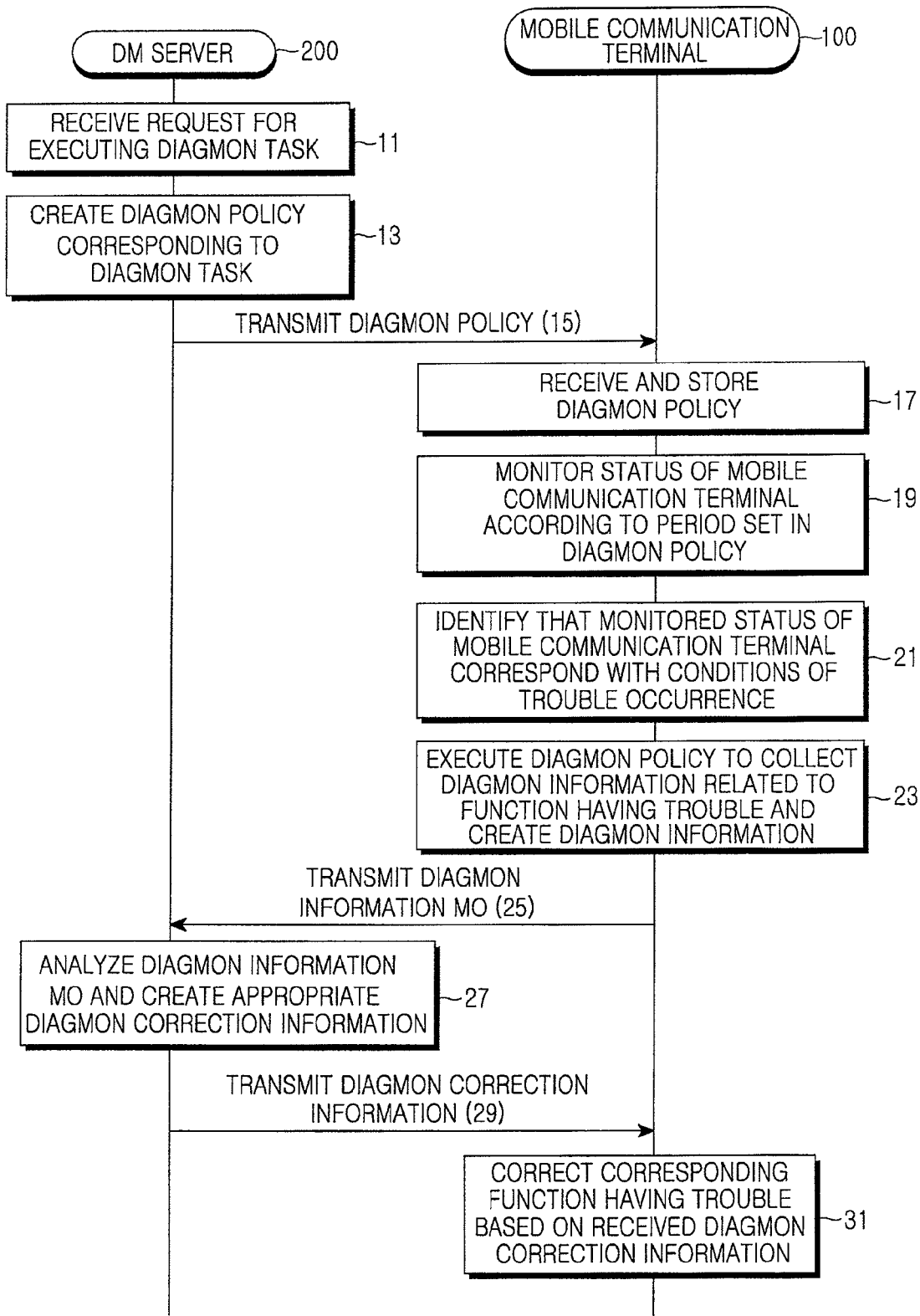
FIG. 3 is a flow chart illustrating a device management process for a mobile communication terminal according to an exemplary embodiment of the present invention.

FIG. 3 illustrates a device management process using the DM server 200, the mobile communication terminal 100, and the communication network 300 according to an exemplary embodiment of the present invention.

Referring to FIG. 3, the DM server 200 receives the request for the DM task execution corresponding to various software and hardware trouble occurable in the mobile communication terminal 100 and to the service errors and the like in step 11. In step 13 the DM server 200 creates a DiagMon policy corresponding to the requested DM task. The DM server 200 transmits the DiagMon policy to the mobile communication terminal 100 in step 15.

The mobile communication terminal 100, in step 17, receives the DiagMon policy from the DM server 200 of step 15 and stores it in the policy storing unit 161. In step 19, the trouble occurrence determining unit 163 of the mobile communication terminal 100 monitors the status of the mobile communication terminal through the monitoring unit 170 according to a period set in the DiagMon policy. At this time, the status of the mobile communication terminal to be monitored is the status of various functions associated with errors which are intended to be diagnosed through the DiagMon policy. The monitor information collected through the monitoring is necessary for identifying whether or not trouble occurs. In step 21, the trouble occurrence determining unit 163 of the mobile communication terminal 100 identifies whether or not the monitored status of the mobile communication terminal corresponds with the conditions of trouble occurrence set in the DiagMon policy, and, if so, informs the policy executing unit 165. In step 23, the policy executing unit 165 executes the DiagMon policy and therefore collects the DiagMon information which is detailed status information related to a function having the trouble, and outputs it to the MO generating unit 180 to create DiagMon information MO. Thereafter, the mobile communication terminal 100 transmits the DiagMon information MO including the collected DiagMon information to the DM server 200 via the communication network 300 in step 25.

For example, if a service rate of a particular application falls below a particular value, it is considered that trouble has occurred. Accordingly, operations set in a DiagMon policy, which is to collect DiagMon information related to the application, for example connection information, device information, etc., may be executed. This may be performed as follows.

The trouble occurrence determining unit 163 requests the monitoring unit 170 to monitor data of the service rate of the corresponding application. Thereafter, the trouble occurrence determining unit 163 identifies whether or not the data of the service rate is below the particular value. If the data of the service rate is below the particular value, the trouble occurrence determining unit 163 informs the policy executing unit 165. The policy executing unit 165 collects and configures the DiagMon information related to the corresponding application and transmits it to the DM server 200.

The DM server 200, in step 27, receives and analyzes the DiagMon information MO sent from the mobile communication terminal 100 of step 27, configures appropriate correction information and creates the DiagMon correction information. The DM server 200 proceeds to step 29 and transmits the DiagMon correction information to the mobile communication terminal 100.

The mobile communication terminal 100 corrects or normalizes a corresponding function having the trouble according to the received DiagMon correction information in step 31.

As mentioned above, the mobile communication terminal 100 receives the DiagMon policies from the DM server 200 in real time and stores them, and then monitors the status of the mobile communication terminal according to periods set in the DiagMon policies. When the mobile communication terminal 100 detects an occurred trouble, it collects detailed information related to the occurred trouble and transmits it to the DM server 200. Then, the mobile communication terminal 100 receives DiagMon correction information capable of correcting the trouble from the DM server 200, corrects the trouble and normalizes the function having the occurred trouble, thereby actively coping with occurring errors and reducing user inconvenience.

Meanwhile, the DiagMon policies are configured to periodically monitor the mobile communication terminal, thereby allowing the operations of monitoring to be performed at the same time when the services related to the DiagMon policies are performed. As a result, errors related the services being performed can be detected in real time.

Figure 4:
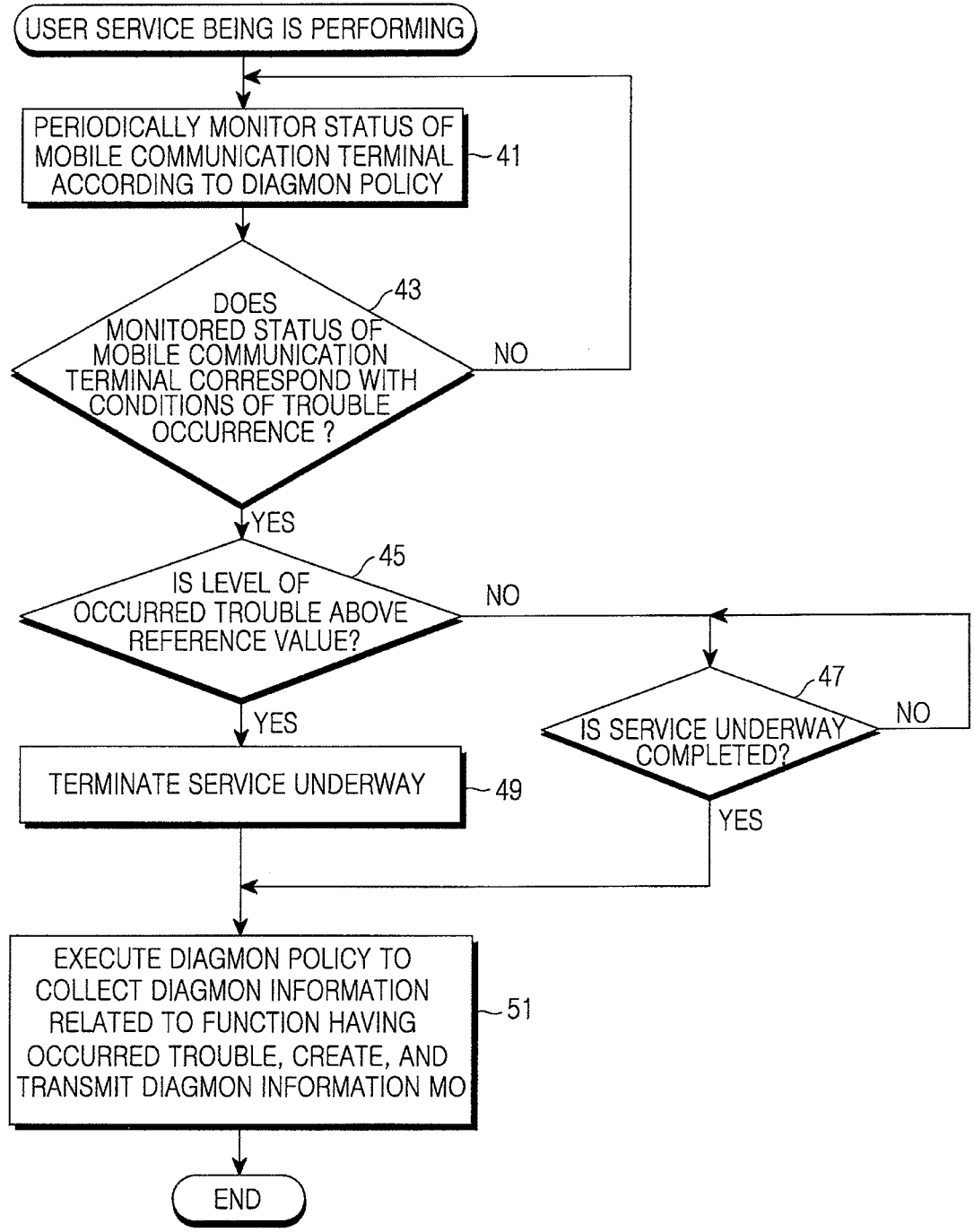
FIG. 4 is a flow chart illustrating an operation process of a mobile communication terminal according to an exemplary embodiment of the present invention.

FIG. 4 is a view illustrating the operation process of the mobile communication terminal 100 according to an exemplary embodiment of the present invention. Referring to FIG. 4, while a user service is being performed, the DiagMon Agent 130 periodically monitors the status of the mobile communication terminal according to a DiagMon policy in step 41. In step 43, if the monitored status of the mobile communication terminal corresponds with a trouble occurrence condition set in the DiagMon policy, the DiagMon Agent 130 determines that the trouble intended to be diagnosed through the DiagMon policy occurs and proceeds to step 45. In step 45, the DiagMon Agent 130 identifies whether or not the level of the occurred trouble is above a reference value. The reference value is a criterion used to determine whether or not the level of the occurred trouble fatally affects the performance of services. For example, there may be a case that data loss above a maximum level may result from the occurred trouble. In step 45, if the level of the occurred trouble is above the reference value, the DiagMon Agent 130 proceeds to step 49. In step 49, the DiagMon Agent 130, in cooperation with the control unit 150, terminates a service underway and proceeds to step 51. In another exemplary embodiment, at this time, the present invention may be configured to have a processor to inform the user of the fact that an error has occurred and induce the service termination. In step 51, the DiagMon Agent 130 executes the DiagMon policy to collect DiagMon data related to the occurred trouble, creates a DiagMon policy MO, and then transmits it to the DM server 200.

On the other hand, in the above-mentioned step 45, if the level of the occurred trouble is not above the reference value, the DiagMon Agent 130 proceeds to step 47 and delays executing the DiagMon policy until the service currently underway is completed. Then, when the service is finished, the DiagMon Agent 130 proceeds to step 51 and executes the DiagMon policy.

Figure 5:
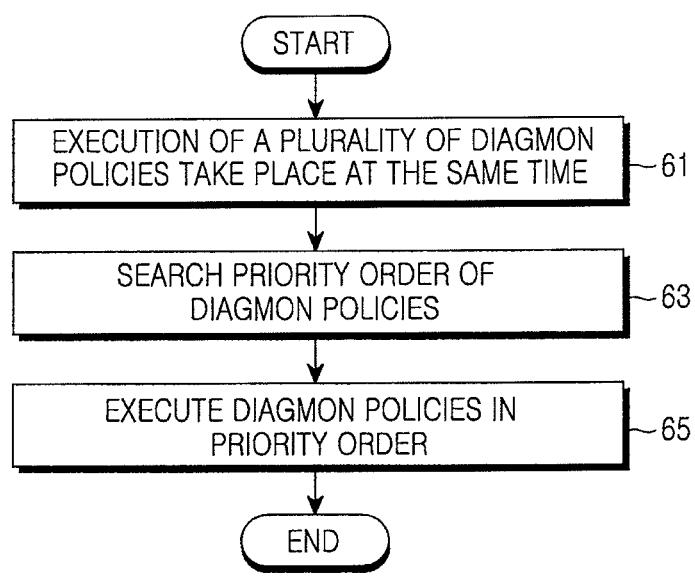
FIG. 5 is a flow chart illustrating an operation process of a mobile communication terminal according to another exemplary embodiment of the present invention.

Since the above-mentioned DiagMon policies are configured corresponding to various troubles occurable in the mobile communication terminal, the mobile communication terminal 100 stores a plurality of DiagMon policies. Therefore, in another exemplary embodiment, several DiagMon policies may be executed at the same time. This case is shown in FIG. 5. If it is detected that a plurality of DiagMon policies are executed at the same time in step 61, the priority order of the DiagMon policies to be executed is determined in step 63. The DiagMon policies are sequentially executed starting with a DiagMon policy having the highest priority in step 65. FIG. 5 is a flow chart illustrating the operation process of the mobile communication terminal according to another exemplary embodiment of the present invention.

As mentioned above, the mobile communication terminal 100 of the present invention receives the DiagMon policies from the DM server 200 in real time and stores them. The DiagMon policies are configured corresponding to various errors. Then, the mobile communication terminal 100 monitors the status of the mobile communication terminal according to the periods set in the stored DiagMon policies. If an error occurrence is detected, the mobile communication terminal 100 collects the detailed information related to the occurred trouble and transmits it to the DM server 200. The mobile communication terminal 100 receives the DiagMon correction information capable of correcting the occurred trouble from the DM server 200, corrects the trouble and normalizes the corresponding function of the terminal, thereby actively coping with occurring errors and reducing user inconvenience. Also, the fact that the error has occurred can be efficiently informed to the DM server, thereby preventing a waste of resources. Since appropriate DiagMon policies are configured, the problems can be solved before the user is aware of that. Consequently, the present invention allows active and immediate management of the occurred errors.

While the invention has been shown and described with reference to certain exemplary embodiments thereof, it will be understood by those skilled in the art that various changes in form and details may be made therein without departing from the spirit and scope of the invention as defined by the appended claims. Accordingly, the present invention should be defined by the scope of the appended claims along with the full scope of equivalents thereof.

What is claimed is:

1. A method for device management of a mobile communication terminal, the method comprising:
   creating and transmitting, by a device management server, a Diagnosis Monitoring (DiagMon) policy corresponding to a trouble that may occur in a mobile terminal;
   receiving and storing, by the mobile terminal, the DiagMon policy;

determining, by the mobile terminal, that the trouble occurs in the mobile terminal when a status of the mobile communication terminal corresponds to a condition of trouble occurrence set in the DiagMon policy;

collecting, by the mobile terminal, detailed status information related to the trouble;

constructing, by the mobile terminal, DiagMon information;

transmitting, by the mobile terminal, the DiagMon information;

analyzing, by the device management server, the DiagMon information;

constructing, by the device management server, DiagMon correction information comprising an application to correct the trouble;

transmitting, by the device management server, the DiagMon correction information;

receiving, by the mobile terminal, the DiagMon correction information; and correcting, by the mobile terminal, the trouble using the DiagMon correction information;

creating, by the device management server, a plurality of DiagMon policies corresponding to troubles on software and hardware installed in the mobile terminal and to troubles caused by services implemented through the mobile terminal and by a communication network;

monitoring, by the mobile terminal, whether troubles occur corresponding to at least one of the plurality of DiagMon policies; and diagnosing, by the device management server, whether the troubles occur or not.

2. The method as claimed in claim 1, further comprising:

creating, by the device management server, at least one of the plurality of DiagMon policies based on analyses of device information received in response to at least one of real-time environment changes of the communication network and existing DiagMon policies; and transmitting, by the device management server, the at least one of the plurality of DiagMon policies created based on the analyses to the mobile terminal.

3. The method as claimed in claim 2, wherein the plurality of DiagMon policies comprise at least one of monitor information types, conditions of trouble occurrence, DiagMon information types, monitoring periods, an internal configuration of the mobile terminal to be monitored and a priority order of DiagMon policies, wherein the monitor information types, the conditions of trouble occurrence, the DiagMon information types, the monitoring periods, the internal configuration of the mobile terminal, and the priority order of DiagMon policies are collected to be used as the basis of determining whether relating troubles occur or not.

4. A system for device management of a mobile terminal, comprising:

a device management server for creating and transmitting a Diagnosis Monitoring (DiagMon) policy corresponding to a trouble that may occur in a mobile terminal, for analyzing DiagMon information received in response to the DiagMon policy, for constructing DiagMon correction information comprising applications to correct the trouble, and for transmitting the DiagMon correction information; and a mobile terminal for receiving and storing the DiagMon policy, for determining that the trouble corresponding to the DiagMon policy occurs in the mobile terminal, for collecting detailed status information related to the trouble, for constructing and transmitting DiagMon information, for receiving the DiagMon correction information related to the DiagMon policy and for correcting the trouble using the DiagMon correction information, wherein the device management server creates a plurality of DiagMon policies corresponding to troubles of various software and hardware installed in the mobile communication terminal and to troubles caused by errors of services implemented through various mobile communication terminals and by errors of communication network, and further wherein the mobile terminal uses the plurality of DiagMon policies to monitor and diagnose whether the troubles occur or not.

5. The system as claimed in claim 4, wherein the device management server further creates at least one of the plurality of DiagMon policies based on analyses of device information received in response to at least one of real-time environment changes of the communication network and existing DiagMon policies, and further transmits the at least one created DiagMon policies to the mobile terminal.

6. The system as claimed in claim 5, wherein the plurality of DiagMon policies comprise at least one of monitor information types, conditions of trouble occurrence, DiagMon information types, monitoring periods, an internal configuration of the mobile communication terminal to be monitored and a priority order of DiagMon policies, wherein the monitor information types, the conditions of trouble occurrence, the DiagMon information types, the monitoring periods, the internal configuration of the mobile communication terminal, and the priority order of DiagMon policies are collected to be used as the basis of determining whether relating troubles occur or not.

7. A method for device management of a mobile terminal, the method comprising:

receiving a Diagnosis Monitoring (DiagMon) policy corresponding to a trouble that may occur in a mobile terminal from a device management server and storing the DiagMon policy;

determining that the trouble corresponding to the DiagMon policy occurs when a status of the mobile terminal corresponds to a condition of trouble occurrence set in the DiagMon policy;

collecting detailed status information related to the trouble, constructing DiagMon information, and transmitting the constructed DiagMon information to the device management server; and receiving DiagMon correction information comprising applications to correct the trouble from the device management server and correcting the trouble using the DiagMon correction information, creating a plurality of DiagMon policies corresponding to troubles of various software and hardware installed in the mobile terminal and to troubles caused by errors of services implemented through various mobile communication terminals and by errors of a communication network;

monitoring, by the mobile terminal, whether troubles occur corresponding to at least one of the plurality of DiagMon policies; and diagnosing by the device management server, whether the troubles occur or not.

8. The method as claimed in claim 7, wherein the plurality of DiagMon policies comprise at least one of monitor information types, conditions of trouble occurrence, DiagMon information types, monitoring periods, an internal configuration of the mobile communication terminal to be monitored and a priority order of DiagMon policies, wherein the monitor information types, the conditions of trouble occurrence, the DiagMon information types, the monitoring periods, the internal configuration of the mobile communication terminal, and
the priority order of DiagMon policies are collected to be used as the basis of determining whether relating troubles occur or not.

9. The method as claimed in claim 8, further comprising:
determining that a trouble corresponding to at least one of the plurality of DiagMon policies occurs while a user service is being performed; and
terminating the user service when a severity level of the occurring trouble is above a reference level, collecting detailed status information related to the trouble, constructing DiagMon information, and transmitting the DiagMon information to the device management server.

10. The method as claimed in claim 9, further comprising:
when the severity level of the occurring trouble is below the reference level, waiting until the user service is completed; and
when the user service is completed, collecting detailed status information related to the trouble, constructing DiagMon information, and transmitting the DiagMon information to the device management server.

11. The method as claimed in claim 8, wherein the plurality of DiagMon policies are sequentially executed according to a priority order thereof when two or more DiagMon policies are executed at the same time.

12. An apparatus for device management of a mobile terminal, comprising:
a Diagnosis Monitoring Agent (DiagMon Agent) comprising a policy storing unit for receiving a Diagnosis Monitoring (DiagMon) policy from a device management sever and for storing the received DiagMon policy wherein the DiagMon policy is created corresponding to a trouble that may occur in a mobile terminal;
a trouble occurrence determining unit for requesting a monitoring unit to monitor the mobile terminal and for determining that a trouble corresponding to the DiagMon policy occurs when a status of the mobile terminal corresponds with a condition of trouble occurrence set in the DiagMon policy; and
a policy executing unit for executing the DiagMon policy when it is determined that the trouble occurs so as to collect detailed status information and construct DiagMon information; and
a DiagMon Enabler for transmitting the DiagMon information to the device management server,
wherein the DiagMon Enabler receives DiagMon correction information including an application for correcting the trouble and corrects the trouble using the DiagMon correction information,
wherein the DiagMon Enabler includes the DiagMon Agent, and
wherein a plurality of DiagMon policies are created corresponding to troubles of various software and hardware installed in the mobile terminal and to troubles caused by errors of services implemented through various mobile communication terminals and by errors of a communication network, and further wherein the mobile terminal uses the at least one DiagMon to monitor and diagnose whether the troubles occur or not.

13. The apparatus as claimed in claim 12, wherein the plurality of DiagMon policies comprise at least one of monitor information types, conditions of trouble occurrence, DiagMon information types, monitoring periods, an internal configuration of the mobile communication terminal to be monitored and a priority order of DiagMon policies,
wherein the monitor information types, the conditions of trouble occurrence, the DiagMon information types, the monitoring periods, the internal configuration of the mobile communication terminal, and the priority order of DiagMon policies are collected to be used as the basis of determining whether relating troubles occur or not.

* * * * *